US012789560B2

(12) United States Patent
Neba

(10) Patent No.: US 12,789,560 B2
(45) Date of Patent: Nov. 10, 2026

(54) METHOD AND SYSTEM FOR DETERMINING THE PRESSURE OF AN AIRCRAFT TIRE

(71) Applicants: COMPAGNIE GENERALE DES ETABLISSEMENTS MICHELIN, Clermont-Ferrand (FR); SAFRAN, Paris (FR); SAFRAN ELECTRONICS & DEFENSE, Boulogne Billancourt (FR); SAFRAN LANDING SYSTEMS, Velizy-Villacoublay (FR)

(72) Inventor: Eric Carin Neba, Clermont-Ferrand (FR)

(73) Assignees: COMPAGNIE GENERALE DES ETABLISSEMENTS MICHELIN, Clermont-Ferrand (FR); SAFRAN, Paris (FR); SAFRAN ELECTRONICS AND DEFENSE, Boulogne-Billancourt (FR); SAFRAN LANDING SYSTEMS, Velizy-Villacoublay (FR)

( * ) Notice: Subject to any disclaimer, the term of this patent is extended or adjusted under 35 U.S.C. 154(b) by 288 days.

(21) Appl. No.: 18/700,588

(22) PCT Filed: Oct. 19, 2022

(86) PCT No.: PCT/EP2022/079115

§ 371 (c)(1),
(2) Date: Apr. 11, 2024

(87) PCT Pub. No.: WO2023/067010

PCT Pub. Date: Apr. 27, 2023

(65) Prior Publication Data

US 2025/0229577 A1 Jul. 17, 2025

(30) Foreign Application Priority Data

Oct. 21, 2021 (FR) ........................................ 2111157

(51) Int. Cl.
*B60C 23/04* (2006.01)
*B60C 23/20* (2006.01)
(Continued)

(52) U.S. Cl.
CPC ...... *B60C 23/0488* (2013.01); *B60C 23/0476* (2013.01); *B60C 23/04* (2013.01);
(Continued)

(58) Field of Classification Search
CPC ............ B60C 23/0488; B60C 23/0476; B60C 2200/02; B60C 23/04; B60C 23/20;
(Continued)

(56) References Cited

U.S. PATENT DOCUMENTS

| | | | |
|---|---|---|---|
| 11,655,053 | B2 | 5/2023 | Arnoux et al. |
| 2005/0162263 | A1 | 7/2005 | Fennel et al. |

(Continued)

FOREIGN PATENT DOCUMENTS

| | | | | |
|---|---|---|---|---|
| EP | 3916370 A1 * | 12/2021 | ............... G01K 7/38 |
| WO | 2009/036547 A1 | 3/2009 | |
| WO | 2019/081746 A1 | 5/2019 | |

OTHER PUBLICATIONS

International Search Report dated Feb. 3, 2023, in corresponding PCT/EP2022/079115 (5 pages).

*Primary Examiner* — Christian T Bryant
(74) *Attorney, Agent, or Firm* — VENABLE LLP

(57) ABSTRACT

A method and a system for determining the temperature in a mounted aircraft tyre is characterized in that it has two temperature sensors installed inside the tire.

8 Claims, 1 Drawing Sheet

(51) Int. Cl.

| | |
|---|---|
| ***B64C 25/36*** | (2006.01) |
| ***B64F 5/60*** | (2017.01) |
| ***G01K 1/02*** | (2021.01) |
| ***G01K 3/06*** | (2006.01) |
| ***G01L 11/00*** | (2006.01) |
| ***G01L 17/00*** | (2006.01) |
| ***G01L 19/00*** | (2006.01) |

(52) U.S. Cl.

CPC .......... *B60C 23/20* (2013.01); *B60C 2200/02* (2013.01); *B64C 25/36* (2013.01); *B64F 5/60* (2017.01); *G01K 1/026* (2013.01); *G01K 3/06* (2013.01); *G01L 11/002* (2013.01); *G01L 17/00* (2013.01); *G01L 19/0092* (2013.01)

(58) Field of Classification Search

CPC ........... B64C 25/36; B64F 5/60; G01K 1/026; G01K 3/06; G01L 11/002; G01L 17/00; G01L 19/0092

See application file for complete search history.

(56) References Cited

U.S. PATENT DOCUMENTS

| | | | | |
|---|---|---|---|---|
| 2006/0042366 | A1 | 3/2006 | Carrus et al. | |
| 2007/0217478 | A1 | 9/2007 | Carlsson et al. | |
| 2008/0216567 | A1* | 9/2008 | Breed | B60C 11/24 73/146.5 |
| 2012/0116694 | A1 | 5/2012 | Norair | |
| 2017/0096037 | A1* | 4/2017 | Smith | B60C 23/0488 |
| 2020/0277086 | A1* | 9/2020 | Arnoux | B60C 23/02 |

* cited by examiner

[Fig 1]
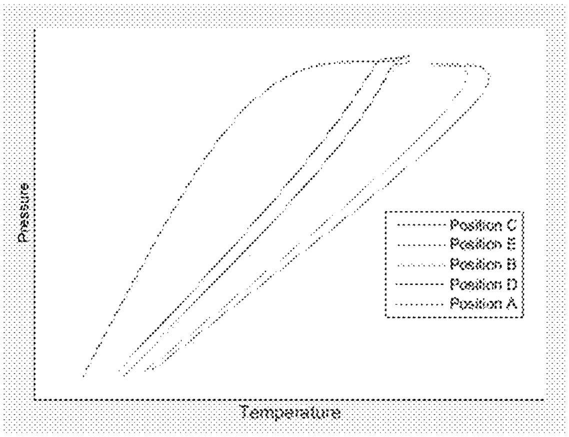
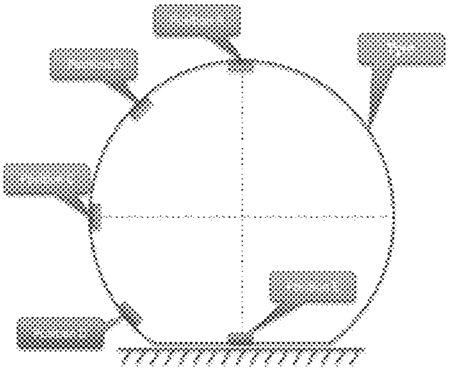
[Fig 2]
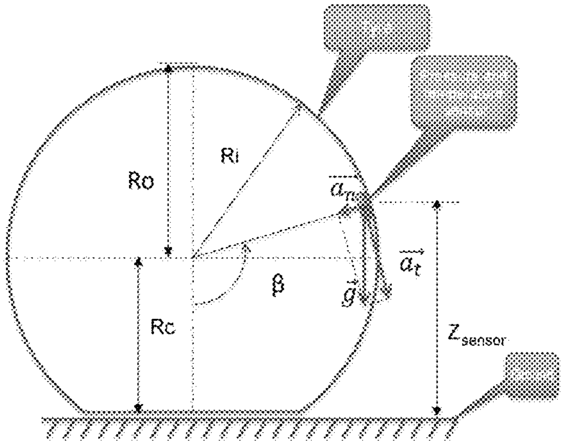

METHOD AND SYSTEM FOR DETERMINING THE PRESSURE OF AN AIRCRAFT TIRE

BACKGROUND

The present invention falls within the field of aeronautics, and more particularly the field of upkeep and maintenance of aircraft tyres. More specifically, the invention relates to the monitoring of the pressure of aircraft tyres.

It is known that poor inflation of aeroplane tyres can cause numerous problems. Thus, overinflation can result in degradation of the tread, either by irregular wear, or by making it more sensitive to detrimental mechanical changes. Conversely, underinflation considerably increases the stresses and heating in the tyre, and this can reduce the lifetime of the tyre, or even cause safety risks such as bursting of the tyre or tread separation.

In order to remedy this situation, it is recommended by tyre manufacturers to carry out daily checking of the pressure of the tyres. It is also generally specified to always carry out this checking when the tyres are cold, i.e. when the internal temperature of the tyres is substantially equal to the ambient temperature. It is also inadvisable to deflate a hot tyre. Documents are thus known that have recommendations for the cold inflation of aeroplane tyres, and the setpoint pressures (Ps) to be applied depending on the type of tyres, on their dimensions, and optionally on the load of the aeroplane. These documents also indicate pressure maintenance recommendations, depending on the differences with respect to Ps. In addition, the technical documentation provided by aeroplane manufacturers indicates procedures to be followed for pressure checking. These procedures indicate that, since the pressure checking has to be performed cold, it is necessary to wait three hours after the stopping of the apparatus to take the measurements.

However, such a procedure has been found to have two major drawbacks. The first is the uncertainty associated with this measurement. Specifically, it has been found that the temperature within the tyre was non-uniform, with variations of up to forty degrees Celsius. In addition, the difference between the internal temperature and the ambient temperature after 3 h can be as much as fifteen degrees Celsius, since it has been found that in reality the time necessary for complete cooling of the tyre is rather of the order of five hours. This leads to errors of up to eleven PSI (i.e. 0.76 bar) in difference between the determined pressure and the actual cold pressure.

The second major drawback is the downtime of the aeroplane, which prevents companies from being able to increase the rate of rotation of their apparatuses.

The present invention therefore aims to remedy these drawbacks by proposing a method and a system for determining the cold pressure of a tyre as a function of measurements taken when hot.

To this end, it appears to be necessary to know the transfer function between a hot tyre and a cold tyre.

However, it has been found, surprisingly, that this transfer function was not identical throughout the tyre. Thus, depending on the position of the sensor at the moment at which the measurements are taken, the results may be distorted. Specifically, when the vehicle is stopped, since the hot air present in the tyre tends to rise, the temperature at the bottom of the tyre will be lower than the temperature at the top of the tyre. The inventors have therefore taken numerous measurements in order to construct the charts presented in FIG. 1. These charts show the temperature/pressure transfer function in a tyre as a function of the position of the sensor in the tyre during the measurement, the various positions being shown in the second diagram of FIG. 1.

Proceeding from this research, the inventors were thus able to propose solutions making it possible to limit the uncertainty due to this positioning of the sensor.

SUMMARY

Thus, the present invention relates to a method for determining the pressure in a mounted aircraft tyre, involving the following steps:

- a step during which a first internal gas temperature is measured at a first position in the tyre, with a first sensor installed in the tyre,
- a step during which a second internal gas temperature is measured at a second position in the tyre, with a second sensor installed in the tyre, the first and the second positions being separated by an angular distance of between 160 and 200 degrees,
- a step during which a “retained” temperature is determined, as a function of the first and second temperatures,
- a step during which a pressure of the internal air of the tyre is determined,
- a step during which a cold pressure of the tyre is determined, as a function of the retained temperature, as a function of the pressure and as a function of a predetermined transfer function.

BRIEF DESCRIPTION OF THE FIGURES

FIG. 1 shows the temperature/pressure transfer function in a tyre as a function of the position of the sensor in the tyre during the measurement.

FIG. 2 represents a second exemplary embodiment of the invention where temperature sensors are used that are also equipped with 3-axis accelerometers.

DETAILED DESCRIPTION

This process is intended to be implemented shortly after the stopping of the vehicle, and the measured pressure is therefore referred to as “hot”. Reference is made to “cold” pressure to denote the reference pressure generally used in recommendations from aeroplane manufacturers, which is a pressure measured when the temperature inside the tyre is substantially equal to the ambient temperature.

In a particular embodiment, the step of determining a pressure of the inflation gas of the tyre comprises a step of measuring pressure with a pressure sensor installed in the tyre, or a step of obtaining a pressure determined by a device outside the tyre.

In a particular embodiment, the retained temperature is determined by selecting the highest temperature out of the first and second temperatures, or by averaging the first and second temperatures.

In a particular embodiment, a method according to the invention further comprises the step of determining the altitude of the sensor that has measured the highest temperature, and wherein the step of determining the cold pressure of the tyre takes this altitude into account.

The invention also relates to a system for determining the pressure in a mounted aircraft tyre, the system having

- at least two temperature sensors installed inside the tyre, the sensors being positioned such that the angular distance between the two sensors is between 160 and 200 degrees, each of the sensors is preferentially placed at between 80° and 100° relative to the running direction, a means for determining the pressure inside the tyre, calculation means making it possible to determine, as a function of a temperature and a pressure, a cold pressure of the tyre.

In a particular embodiment, the means for determining the pressure is included in the group comprising: a pressure sensor installed in the tyre, a pressure sensor installed on the associated rim, or an external measuring device such as a manometer.

In a particular embodiment, the temperature sensors comprise accelerometers making it possible to determine the altitude of the sensor.

In a particular embodiment, a system according to the invention further comprises means for determining the temperature of the brake associated with the tyre.

Various exemplary embodiments of the invention will now be described. It is specified here that these examples will describe both a method according to the invention, and also constituent elements of a system according to the invention.

Thus, an exemplary complete system allowing the implementation of all the embodiments of the present invention has the following elements:

at least two temperature sensors installed in the tyre, a mobile apparatus, which may take the form of a mobile telephone or a reader of any type, having means for reading the measurements taken by the sensors, and means for transmitting these measurements to calculation means, calculation means, installed either in the mobile apparatus or on a remote server, and in this case the mobile apparatus comprises means that are able to allow the exchange of data between the mobile apparatus and the remote server, advantageously, a user interface allowing an operator to consult data on the mobile apparatus, or to enter certain data necessary for the implementation of a method according to the invention (for example data concerning the ambient temperature, a pressure of the tyre, a brake temperature, etc.).

In addition, a system according to certain embodiments of the invention may optionally comprise:

accelerometers installed in the temperature sensors, means for determining the pressure in the tyre.

In a first exemplary embodiment, a system having two temperature sensors attached to the inner liner of a mounted tyre is used. These two sensors are situated diametrically opposite one another. Thus, when the vehicle is stationary, and the tyre therefore no longer moves in rotation with respect to the ground, there is guaranteed to be one sensor situated in the top part of the tyre, namely above a horizontal diameter of the tyre, and one sensor situated in the bottom part of the tyre.

The two sensors take a measurement of the temperature inside the tyre. Advantageously, the sensors are equipped with wireless communication means allowing them to communicate with a mobile apparatus on which is installed an application developed specifically for the implementation of the invention.

Thus, the mobile apparatus can read the values of the measurements taken by the sensor. Depending on the embodiments, the implementation of the method can continue directly at the mobile apparatus, which is equipped with calculation or storage means, or else in a remote server with which the mobile apparatus communicates.

When the temperatures measured by the two sensors are known, a method according to the invention comprises the step of determining a temperature that is retained for the rest of the calculation. Two options are possible: in one example, the retained temperature is the highest temperature. Specifically, the highest temperature comes from the sensor situated in the top part of the tyre, and it has been found that, in the top part of the tyre, the transfer function between hot tyre and cold tyre varies little and is independent of the braking energy or temperature.

In another example, which is advantageously used in the case in which the two sensors are situated substantially at the same height, it is possible to average the two measured values in order to determine the retained value.

Various ways of implementing this determination of retained temperature may be envisaged:

either one or the other of the options set out above is used systematically, whatever the situation, or the method to be used is determined depending on choice criteria: for example, if it is determined that the difference between the two measured temperatures is less than a certain value, for example 2° C. with an accuracy of +/−1° C. of the temperature measurement, or if it is determined that the difference in altitude between the two sensors is less than a certain value, for example 5 mm in this case, averaging is chosen, and in other cases the maximum method is used.

Once the retained temperature has been determined, and knowing the pressure of the tyre at the instant of taking the temperature, it is then possible to determine the cold pressure in the tyre using the following formula: $P\_cold=Pmeasured-A*(Tretained-Tambient)$, in which A is a constant dependent on the characteristics of the sensors and the tyre. The pressure measurement can be taken by any means described in the present document.

It is specified here that the use of two sensors has other advantages, compared with existing systems:

on the one hand, two temperature measurements are taken, and this means that even in the event of damage to one sensor, it is still possible to determine a cold pressure: to this end, in an exemplary embodiment, a method according to the invention provides that, in the case in which one temperature measurement is absent, the retained temperature is equal to the single measured temperature, on the other hand, the fact of positioning two sensors diametrically opposite one another makes it possible to better balance the tyre, and to avoid the phenomena of imbalances that cause premature wear or risks of failure.

Finally, it is also possible to envisage the case in which an operator, who has to interrogate the temperature sensors, merely interrogates the sensor situated in the top part of the tyre, which is more accessible than the sensor situated in the lower part, or even in the region of the contact patch in which the tyre makes contact with the ground, making it difficult to access. In this case, the lower sensor, which would not be interrogated, could be likened to a faulty sensor.

A second exemplary embodiment of the invention will now be described. In this example, described with reference to FIG. 2, temperature sensors are used that are also equipped with 3-axis accelerometers. The accelerometer is installed on or near the sensor, such that these axes ($\vec{xc}$, $\vec{yc}$, $\vec{zc}$) correspond to the cylindrical frames of reference ($\vec{n}$, $\vec{y}$, $\vec{t}$) of the tyre. This makes it possible to know the altitude of the accelerometer and therefore of the sensor, starting with determining the azimuth B, from the accelerations measured along the normal axis and the tangential axis of the accelerometer, which are components of the acceleration due to gravity, using the following formula:

$$\beta = \frac{\pi}{2} + a\tan\left(\frac{a_n}{a_t}\right)$$

Knowing this azimuth, it is then possible to calculate the precise altitude Zsensor in two ways:

Either with the compressed radius Rc and the inflated radius Ri of the tyre: $Z_{sensor}$=Rc+Ri*sin β

Or with a pre-established law Z_sensor (β) in order take into account the "ovalization" of the tyre with compression, because the radius Ri varies according to the angle β.

In this embodiment, the cold pressure of the tyre is determined by taking into account the altitude of the sensor of which the temperature measurement has been retained, using the following formula: $P_{cold}$=Pm−(B*$Z_{sensor}$+C)*(Tretained−Tamb) where B and C are constants, which are dependent on the characteristics of the sensor and the tyre.

In a third embodiment, a method according to the invention takes into account an additional parameter for determining the cold pressure, namely the brake temperature. Specifically, it has been found that, in particular when a temperature sensor is situated in the lower part of the tyre, close to the contact patch, the cooling dynamics depend on the brake temperature. Thus, taking this temperature into account makes it possible to improve the precision of a method according to the invention.

This brake temperature can be obtained in various ways:

it can be received directly from the aeroplane, for example via a wireless connection between the mobile apparatus and telecommunications means installed in the aeroplane, it can be entered directly into the mobile apparatus by an operator in charge of the maintenance of the apparatus, it can be estimated by the calculation means as a function of certain common variables of the aeroplane, for example by using the following formula:

$$Tbrake = AT * W_{brake}^2 + BT * W_{brake} + CT \text{ with:}$$

$$\begin{cases} W_{brake} = \int_{braking} (Ma * ax - (F_{thrust}(1 - R * + ActivREv) + Faero)) * dD \\ Faero = -\frac{1}{2} * \rho * S * C_x^0 * V^2 \\ C_x^0 = \dfrac{Ma * ax^0}{\frac{1}{2} * \rho * S * V_0^2} \end{cases}$$

Where: Ma: aeroplane mass on landing, ax: longitudinal acceleration,

Fthrust: denotes the thrust of the engines,

ActivRev: indicator of the opening of the doors of the reverse system: 0 if open, 1 if closed, R: ratio of thrust directed towards the front of the aeroplane, Faero: aerodynamic drag, D: distance travelled, Cx: drag coefficient, S: surface area of the maximum cross section of the wing, ρ: density of the air, V: aeroplane speed/V0 speed on landing AT, BT and CT are constants dependent on the characteristics of the brake and the aeroplane.

In the exemplary embodiments described so far, the temperature measurements are considered to be taken shortly after the stopping of the aeroplane, i.e. within a period of 15 min to 2 h following this stopping.

In this fourth exemplary embodiment, an advantageous way of determining the cold pressure, whatever the moment at which the temperature measurements are taken, will be described. To do this, starting from the estimation of the temperature at the start of the parking Tstop, the time from the stopping of the tyre during which the pressure is likely to increase dtMaxStrat is estimated, and the pressure increase dPMaxStrat, as a result of the heat exchanges with the brake.

The time dt that has elapsed since the stopping of the tyre is known, from the component 3 of the solution:

If dt>dtMaxStrat: the pressure of the inflation gas decreases, following a decreasing exponential law, which makes it possible to estimate the pressure of the tyre after a certain time dt starting from the current instant such that:

$$P(tm + dt) = (Pm - P_{cold}) * \exp\left(\frac{dt}{\tau}\right) + P_{cold}$$

Where:

the time constant t depends on the characteristics of the tyre,

Pcold is the estimated cold pressure, tm is the current measurement instant,

Pm: pressure measured at the current instant dt: time elapsed since the instant tm It is also possible to estimate the time dtCold, from the current instant, after which the pressure will reach Pcold+εp, εp being the desired measurement accuracy, i.e.:

$$dtCold = \frac{\ln\left(\frac{\varepsilon P}{Pm - P_{cold}}\right)}{\tau}$$

If dt<dtMaxStrat: the pressure of the gas increases more or less rapidly during dtMaxStrat, as a function of the temperature Tstop at the start of the parking. Then the change in pressure follows a decreasing exponential law starting from tMaxStrat, and this makes it possible to estimate the pressure of the tyre after a certain time dt (=tMaxSrat−tm+dt') starting from the current instant tm:

$$P(dt) = (P\max - P_{cold}) * \exp\left(\frac{dt - (t\text{Max}Strat - tm)}{\tau}\right) + P_{cold}$$

Where Pmax: maximum pressure during the parking, measured at tMaxStrat.

It is also possible to estimate the time dtCold, from the current instant, after which the pressure will reach Pcold+εp, εp being the desired measurement accuracy, i.e.:

$$dtCold = \frac{\ln\left(\frac{\varepsilon P}{P\max - P_{cold}}\right)}{\tau} + (t\text{Max}Strat - tm)$$

The invention claimed is:

1. A method for determining a pressure in a mounted aircraft tire, the method comprising the following steps:

a step during which a first internal gas temperature is measured at a first position in the tire, with a first sensor installed in the tire;

a step during which a second internal gas temperature is measured at a second position in the tire, with a second sensor installed in the tire, the first and the second positions being separated by an angular distance of between 160 and 200 degrees;

a step during which a retained temperature is determined, as a function of the first and second internal gas temperatures;

a step during which a pressure of the internal air of the tire is determined; and a step during which a cold pressure of the tire is determined, as a function of the retained temperature, as a function of the pressure and as a function of a predetermined transfer function.

2. The method according to claim 1, wherein the step of determining a pressure of the internal air of the tire comprises a step of measuring pressure with a pressure sensor installed in the tire, or a step of obtaining a pressure determined by a device outside the tire.

3. The method according to claim 1, wherein the retained temperature is determined by selecting a highest temperature out of the first and second internal gas temperatures, or by averaging the first and second internal gas temperatures.

4. The method according to claim 1, further comprising a step of determining an altitude of a sensor that measured a highest temperature, wherein the step of determining the cold pressure of the tire takes the altitude into account.

5. A system for determining a pressure in a mounted aircraft tire, the system comprising:

at least two temperature sensors installed inside the tire, the at least two temperature sensors being positioned such that an angular distance between the at least two temperature sensors is between 160 and 200 degrees;

a means for determining the pressure inside the tire; and calculation means to determine, as a function of a temperature and a pressure, a cold pressure of the tire.

6. The system according to claim 5, wherein the means for determining the pressure is selected from the group consisting of a pressure sensor installed in the tire, a pressure sensor installed on an associated rim, and an external measuring device.

7. The system according to claim 5, wherein the at least two temperature sensors comprise accelerometers.

8. The system according to claim 5, further comprising means for determining a temperature of a brake associated with the tire.

* * * * *